Figure 1:
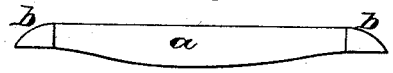

(No Model.)

H. BLAKE.
BELT FASTENER.

No. 282,258. Patented July 31, 1883.

Attest
Thos. J. Danner
Philip Mauro

Henry Blake
Inventor.
by A. Pollok
his Attorney.

UNITED STATES PATENT OFFICE.

HENRY BLAKE, OF PEPPERELL, MASSACHUSETTS, ASSIGNOR OF ONE-HALF TO J. ASHTON GREENE, OF BROOKLYN, NEW YORK.

BELT-FASTENER.

SPECIFICATION forming part of Letters Patent No. 282,258, dated July 31, 1883.

Application filed May 28, 1883. (No model.)

*To all whom it may concern:*

Be it known that I, HENRY BLAKE, of Pepperell, in the county of Middlesex and Commonwealth of Massachusetts, have invented a new and useful Improvement in Belt-Fasteners, which improvement is fully set forth in the following specification.

This invention relates to devices for fastening the meeting ends of belting for pulleys, and has for its object to produce an inexpensive and strong fastener capable of ready application, and which makes a smooth joint, with little or no projecting parts above the surface of the belt.

Heretofore fasteners have been made of a single piece punched from a sheet or strip of suitable metal, and consisting in a straight shank or bar square in cross-section, terminating at each end in a segmental head or cross-piece at right angles to the stem or shank. To apply these the meeting ends of the belt are brought together back to back, the fastener inserted through longitudinal slits in each, and then turned so as to bring the cross-pieces at right angles to the slits. The belt is then flattened out, and in so doing the fastener is bent into the shape of a V, with its angle below the belt and its legs passing one through each of the meeting ends, and held from slipping out by the heads or cross-pieces. A belt-fastener of this description is shown in Patent No. 31,859 to G. W. Blake, dated March 26, 1861, upon which the present invention is an improvement. This fastener or stud has certain disadvantages which it is the object of the present invention to obviate. The weakness of the old stud is found to lie in the shank or bar, which is liable to be strained in the bending incident to applying the stud to a belt. In the improved stud this weakness is removed by swaging the bar or shank. This may be done on two or on all four sides of the bar or shank, and the result is to toughen or harden the metal and to flatten the bar or shank, preferably in a plane at right angles to the heads. This shape is preferred, because it brings the thickness of the bar or shank in the direction of the bend given to it in applying the stud to a belt; and, moreover, the flattening of the shank occasions a less displacement of the leather of the belt, thereby avoiding weakening thereof at the joint. Heretofore the studs being bent after their application to the belt, and the heads being in the same plane with the bar or shank, the said heads project their full length above the surface of the belt, often occasioning their breakage or checking the running of the pulleys should they strike any fixed object, and sometimes injuring the workman, when, as is not uncommon, the belt is shifted by hand. In the improved stud the shank or bar is slightly curved downward in the course of manufacture, when the bending can be done with much less liability to straining the metal than when it is performed after being placed in the belt, and the heads of the stud are bent downward, so that their under surface will lie flat upon the belt instead of projecting above it, and a smooth and even joint be made.

Figure 2:
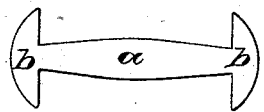
Figure 3:

In the accompanying drawings, Figure 1 is a side view of a belt-stud having a swaged bar or shank; Fig. 2, a top view, showing the bar flattened in the opposite direction from that of Fig. 1; Fig. 3, a side view of the stud after it has been bent to an undulating form; and Fig. 4, a section of the meeting ends of a belt, showing the improved stud in place therein. The drawings are on an enlarged scale.

The studs comprising a bar, *a*, and heads *b*, having been formed by stamping or cutting from a sheet of metal or otherwise, the bar or shank is hardened or stiffened by swaging, giving to said bar or shank the final shape shown in Fig. 1, or that shown in Fig. 2. As has been said, the former shape is deemed preferable, because not only does the bar possess the additional strength imparted by swaging, but with the same weight of metal the thickness of the stud is brought in the direction necessary to resist the strain of bending. In addition to this, by reason of the narrowness of the shank or bar there is less strain upon the leather of the belt.

Figure 4:
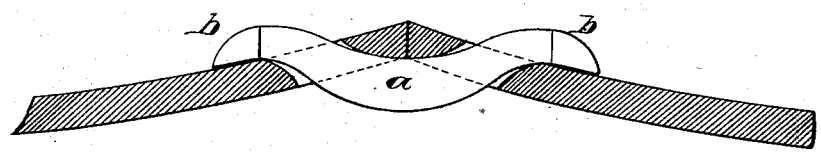

Instead of, as heretofore, having the heads in the same line with the bar or shank the latter is curved downward in the middle, and also bent slightly at the ends, (see Fig. 3,) so as to bring the under surface of the heads about in line with the top of the bar. The object is to make a smoother joint by causing the heads to lie flat upon the belt, as shown in Fig. 4. The previous bending of the stud to approximately the shape it will have when in use is very advantageous, because it can be done gradually and with equal pressure upon all parts by means of dies, and with much less liability of straining the metal.

The article, when completed, possesses greater strength and durability than the old studs, and makes a joint with little or no unevenness and no projecting edges.

I claim—

1. A belt-stud having T-heads, and a bar or shank flattened approximately at right angles to said heads, said bar or shank being compressed by swaging, substantially as described.

2. A belt-stud having cross-heads, and a bar or shank flattened approximately at right angles to said heads and bent near its ends, so that said heads lie flat upon the belt, substantially as described.

In testimony whereof I have signed this specification in the presence of two subscribing witnesses.

HENRY BLAKE.

Witnesses:
WILLIAM A. WRIGHT,
BENJ. H. HARTWELL.